US 8,458,206 B2

(12) United States Patent
Bolsius et al.

(10) Patent No.: US 8,458,206 B2
(45) Date of Patent: Jun. 4, 2013

(54) SYSTEMS AND METHODS FOR PROVIDING CUSTOM OR CALCULATED DATA MEMBERS IN QUERIES OF A BUSINESS INTELLIGENCE SERVER

(75) Inventors: Roger Bolsius, Round Rock, TX (US); Raghuram Venkatasubramanian, Cupertino, CA (US); Ling Ni, Milpitas, CA (US); Donko Donjerkovic, Redwood City, CA (US); Saugata Chowdhury, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 150 days.

(21) Appl. No.: 13/038,243

(22) Filed: Mar. 1, 2011

(65) Prior Publication Data

US 2011/0295870 A1 Dec. 1, 2011

Related U.S. Application Data

(60) Provisional application No. 61/349,754, filed on May 28, 2010.

(51) Int. Cl.
*G06F 17/30* (2006.01)

(52) U.S. Cl.
USPC .......................................... 707/765; 707/769

(58) Field of Classification Search
USPC ......................................... 707/765, 769, 714
See application file for complete search history.

(56) References Cited

U.S. PATENT DOCUMENTS

| | | | |
|---|---|---|---|
| 5,787,410 A | 7/1998 | McMahon | |
| 5,805,832 A | 9/1998 | Brown et al. | |
| 6,018,742 A | 1/2000 | Herbert, III | |
| 7,151,438 B1 | 12/2006 | Hall et al. | |
| 7,444,342 B1 | 10/2008 | Hall et al. | |
| 7,698,264 B2* | 4/2010 | Leikucs et al. | 707/999.003 |
| 7,783,724 B2* | 8/2010 | Winter et al. | 709/219 |
| 7,853,557 B2 | 12/2010 | Schneider et al. | |
| 8,200,618 B2* | 6/2012 | Gibson et al. | 707/603 |
| 8,234,298 B2 | 7/2012 | Winter et al. | |
| 2006/0136309 A1 | 6/2006 | Horn et al. | |
| 2006/0149716 A1 | 7/2006 | Polo-Malouvier | |
| 2007/0250493 A1 | 10/2007 | Peoples et al. | |

(Continued)

OTHER PUBLICATIONS

Stober, D., Fueling the Workflow Engine, Intermountain Healthcare, OAUG Forum at Collaborate 2008, http://idealpenngroup.tripod.com/sitebuildercontent/OAUG2008/Collaborate20Collaborate07/pdfs/dstober_wp.pdf [retrieved on Jul. 12, 2011], pp. 1-67.

(Continued)

*Primary Examiner* — Jean M Corrielus
(74) *Attorney, Agent, or Firm* — Fliesler Meyer LLP

(57) ABSTRACT

A business intelligence (BI) server and repository are described which support a set of customized and/or calculated data members. In accordance with an embodiment, the BI server maintains a connection to a plurality of data sources which may store a set of dimension members. The data source can be relational, file storage based, multidimensional and other types. In accordance with an embodiment, the BI server can accept queries from the user that contain calculated members as a parameter. The calculated member is defined by an expression including multiple dimension members and one or more arithmetic operators. The BI server can parse and validate the query and rewrite the query for the data source. After the query is rewritten and optimized, it is executed against the data source and a set of results is received.

20 Claims, 4 Drawing Sheets

U.S. PATENT DOCUMENTS

| | | | |
|---|---|---|---|
| 2007/0250494 A1 | 10/2007 | Peoples et al. | |
| 2007/0299937 A1* | 12/2007 | Winter et al. | 709/219 |
| 2008/0059412 A1 | 3/2008 | Tarin | |
| 2008/0189332 A1* | 8/2008 | Winter | 707/104.1 |
| 2008/0249998 A1 | 10/2008 | Dettinger | |
| 2008/0288525 A1* | 11/2008 | Leikucs et al. | 707/102 |
| 2008/0306923 A1 | 12/2008 | Drissi et al. | |
| 2009/0030915 A1 | 1/2009 | Winter et al. | |
| 2009/0119309 A1* | 5/2009 | Gibson et al. | 707/100 |
| 2009/0125497 A1 | 5/2009 | Jiang et al. | |

OTHER PUBLICATIONS

Oracle Applications Internationalization Guide, Applications Technology Group, Aug. 9, 2006, http://www.soulcast.com/post/show/12554/Oracle-Applications-Internationalization-Guide [retrieved on Jul. 12, 2011], 24 pages.

\* cited by examiner

SYSTEMS AND METHODS FOR PROVIDING CUSTOM OR CALCULATED DATA MEMBERS IN QUERIES OF A BUSINESS INTELLIGENCE SERVER

CLAIM OF PRIORITY

The present application claims the benefit of U.S. Provisional Patent Application No. 61/349,754, entitled "SYSTEMS AND METHODS FOR PROVIDING VALUE HIERARCHIES, RAGGED HIERARCHIES, SKIP-LEVEL HIERARCHIES, MULTILINGUAL DOUBLE COLUMN SUPPORT AND CUSTOM MEMBERS IN A BUSINESS INTELLIGENCE SERVER," by Roger Bolsius et al., filed on May 28, 2010, which is incorporated by reference herein in its entirety, including all Appendices filed therewith.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to business intelligence and in particular to queries executed by a business intelligence server.

BACKGROUND

In recent years, business intelligence software has become increasingly utilized by large business enterprises and other organizations. Business intelligence provides current and historical views of business operations by analyzing internal, structured data and business processes of the organization. It is often used to create future models and predictions in order to support better business decision making. As such, business intelligence tools can lead to decreased costs and increased efficiency, productivity and profit margins for many companies.

Business intelligence is usually implemented as software and/or hardware tools that are used to collect and analyze data and to transform the raw data into meaningful and useful information used to enable more effective strategic, tactical, and operational insights and decision-making. As such, a typical business intelligence server relies on data that may reside in a variety of places, including but not limited to relational databases, online analytical processing (OLAP) tools, repositories and content management systems, application servers, as well as a number of other sources.

In a typical business intelligence (BI) server, data is collected from all (or some) of these data sources and placed into a (virtual or physical) data warehouse or data mart, where it can then be modeled and analyzed before being presented to the user. For example, one approach is to implement a physical layer within the business intelligence server, where data is modeled as a consolidated table that mirrors objects in the data source layer. An application developer can assemble these compound objects by hand, using a subset of the entities relevant to the domain; the synthesized objects can subsequently be imported into the business intelligence server's metadata and decomposed into dimensions and facts.

However, a number limitations and potential areas of improvement still exist in the field of modeling and querying data within the context of business intelligence servers. For example, executing logical structured query language (SQL) queries against the BI server and/or data sources is often a slow and complex task for users to manage. The syntax of such queries can be verbose and rigid and is often difficult to learn. In addition, for more complicated queries, the query shape does not lend itself well for re-writes to online analytical processing (OLAP) sources, which support a variety of native constructs to simplify selections of data. In light of the foregoing, what is needed is a simpler and more efficient way to perform data querying in the context of business intelligence.

SUMMARY OF INVENTION

In accordance with various embodiments, systems and methods are described for allowing a business intelligence (BI) server to implement custom or calculated data members in data queries. Custom members allow the BI server to take two or more dimension members which may be stored in a data source and create ad-hoc dimension members within the query as a parameter by using arithmetic operations, such as addition, subtraction, multiplication, division and the like. This ad-hoc calculated member can be a composition of a plurality of existing dimension members. As such, users can create custom members as part of the query which involve existing dimension members from one or multiple levels of the hierarchy, items and attributes that are not within a dimension and other data. The user is also given control over where the calculated member is displayed.

In accordance with an embodiment, the BI server maintains a connection to a plurality of data sources which may store a set of dimension members. The data source can be relational, file storage based, multidimensional and other types. In accordance with an embodiment, the BI server can accept queries from the user that contain calculated members as a parameter. The calculated member is defined by an expression including multiple dimension members and one or more arithmetic operators. The BI server can parse and validate the query and rewrite the query for the data source. After the query is rewritten and optimized, it is executed against the data source and a set of results is received.

DETAILED DESCRIPTION

Figure 1:
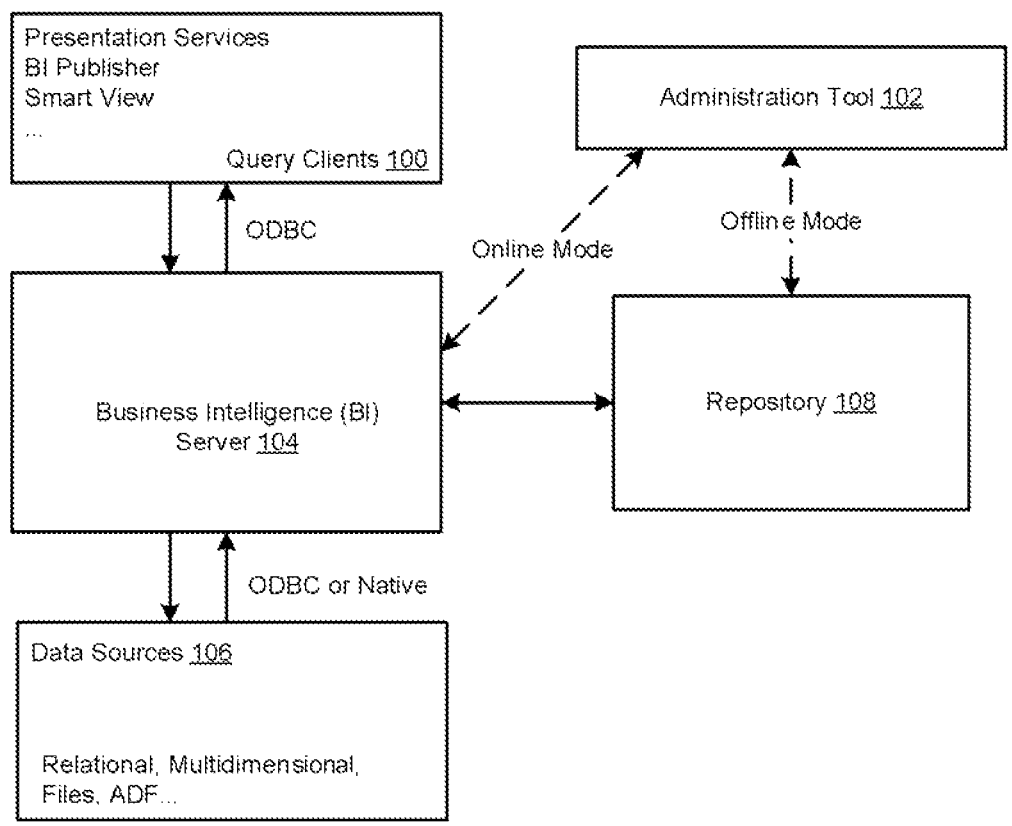
FIG. 1 is an illustration of the BI server in accordance with various embodiments of the invention.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

In accordance with various embodiments of the invention, the BI server can enable users to create custom or calculated data members as part of the query without requiring any administration tool. For example, a data source may store several dimension members that have factual values associated with them. A user can then create an ad-hoc custom member that involves these dimension members from one level, multiple levels, items and/or attributes. In addition, the user can have control over where the custom member is displayed. This custom or calculated member can then be used as a parameter to the query during its execution.

As an illustration, if the data source contains data members such as "California" and "San Francisco", then a user may wish to simply create a calculated member by entering an expression such as "My_city=(California—San Francisco)" into the query. The fact values for this ad-hoc dimension member are then obtained by the BI server by performing the arithmetic that was used to define the custom member. In this example, the sales for San Francisco would be subtracted from the sales of all of California to create a custom member "My_City" which is used as a parameter to the query.

In addition to calculated members, custom aggregates can also be provided on the BI server. In accordance with an embodiment, a custom aggregate is an ad-hoc dimension member that is defined as a composition of existing dimension members. For example, a user can define an ad-hoc dimension member "my_geographies" which consists of "New York", "Boston" and "California" by using an expression similar to "my_geographies=('NY', 'Boston', 'California')." Similar to calculated members, the custom aggregate is also created as part of the query and there is no requirement of separately creating the construct before hand using various administrative tools.

It should be noted that as an alternative to using the custom aggregates function, users can use a function like "UNION ALL" to combine multiple queries to simulate post-aggregation selections. For example, the following logical SQL statement can be used to retrieve data for specific cities in the "East" region, while ensuring that the fact value for "East" contains data for all eastern cities:
Select Region, Sales from paint
UNION ALL
Select City, Sales from paint where city IN ('NY', Boston')

However, this approach comes with a set of limitations. These types of queries can quickly become very verbose and complex. Query optimization possibilities are often greatly reduced. In addition, this query shape doesn't lend itself well for rewrites to OLAP based sources which support rich, native constructs for these types of selections. As such, the ability to insert calculated members into queries can simplify the users' queries, provide better flexibility and improve query optimization and rewrite options.

It is noted that throughout this disclosure, the terms "custom member" and "calculated member" are used interchangeably and are intended to mean the same thing, while the term "custom aggregate" is a different term having its own separate definition.

FIG. 1 is an illustration of a BI server in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the BI server 104 and the BI repository 108 provide a layer of abstraction that lets users 100 send simple logical structured query language (SQL) queries against complex federated data sources 106. In accordance with an embodiment, the BI server 104 processes user requests and queries underlying data sources. The BI server can maintain a logical data model and provide client access to this model through open database connectivity (ODBC).

In accordance with an embodiment, the BI server uses the metadata in the repository 108 to perform two tasks (1) to interpret logical SQL queries and write corresponding physical queries against the appropriate data sources 106; and (2) to transform and combine the physical result sets and perform final calculations. The BI server can connect to the underlying data source through either ODBC or over a native application programming interface (API) of the data source.

In accordance with an embodiment, the administration tool 102 is an application that can be used to create and edit the BI repository 108. The admin tool can connect to the repository in offline mode, or it can connect to the repository through the BI server (online mode). In accordance with various embodiments, the additional functionality provided by the BI server can be made available in the online mode.

Figure 2:
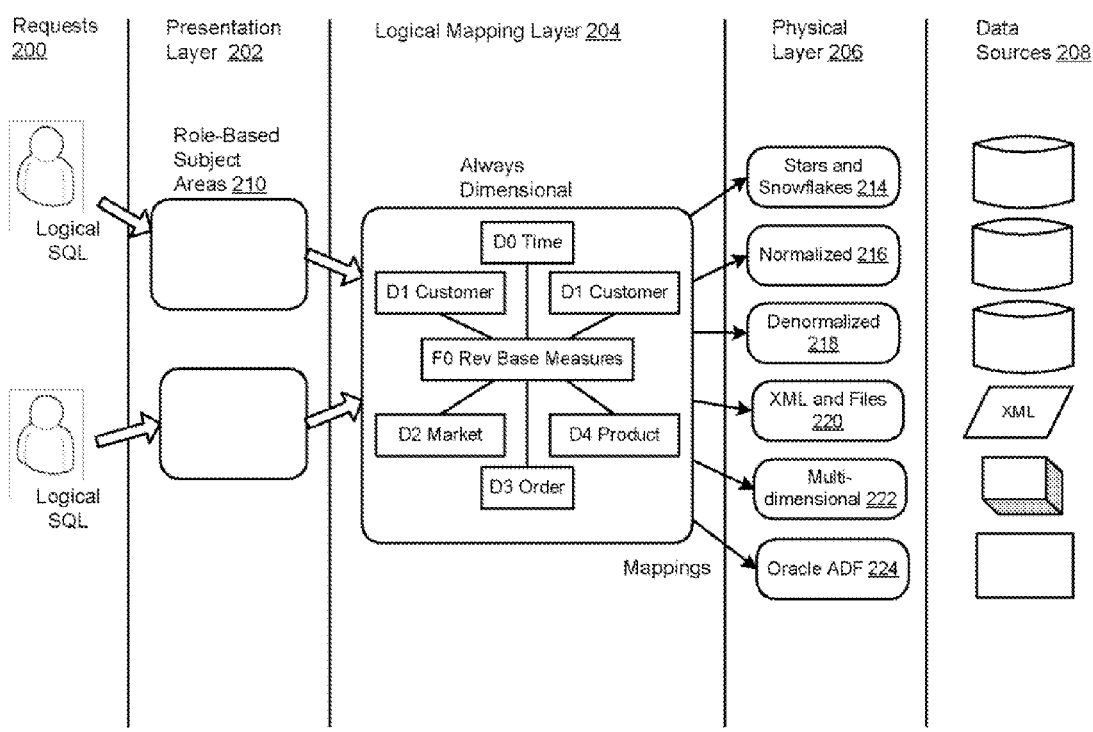
FIG. 2 is an illustration of a query traversing the layers of the BI repository in accordance with various embodiments of the invention.

FIG. 2 is an illustration of a query traversing the layers of the BI repository in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As mentioned above, the BI server can process incoming client requests 200 that are sent against complex federated data sources. In accordance with an embodiment, the BI repository is comprised of three layers: the physical layer 206, the logical mapping layer 204 and the presentation layer 202.

In accordance with an embodiment, the physical layer 206 defines the objects and relationships the BI server needs to write native queries against each physical data source 208. In accordance with an embodiment, a user or administrator creates this layer by importing tables, cubes and flat files from the data sources. For example, as shown in this figure, some of the formats and schemas used in the physical layer can include stars and snowflakes 214, normalized 216 and denormalized 218 data, extensible markup language (XML) and file storage data 220, multi-dimensional data 222, application development framework (ADF) data 224 and other formats. Separating the logical behavior of the application from the physical model provides the ability to federate multiple physical data sources to the same logical object, enabling aggregate navigation and partitioning, as well as dimension conformance and isolation from changes in the physical sources. This separation also enables the creation of portable BI applications.

In accordance with an embodiment, the logical business model and mapping layer 204 defines the business or logical model of the data and specifies the mapping between the business model and the physical schemas. This layer also determines the analytic behavior seen by users, and defines the superset of objects and relationships available to the users. It also hides the complexity of the source data models.

In accordance with an embodiment, the presentation layer 202 provides a way to present customized, secure, role-based views 210 of a business model to users. It adds a level of abstraction over the business model and mapping layer 204 and provides the view of the data seen by users building requests in the presentation services and other clients 200.

In accordance with an embodiment, a typical order for an enterprise to constructs a BI repository is to create the physical layer objects firs, the logical model and mapping layer objects next and the presentation layer objects last. However, in alternative embodiments, the user can work on each layer at any stage.

In most cases, planning the business model is the first step in developing a usable data model for decision support. In a business model, a dimension represents a hierarchical organization of logical columns (attributes). One or more logical dimension tables can be associated with at most one dimension. Examples of common dimensions are time periods, products, markets, customers, suppliers, promotion conditions, raw materials, manufacturing plants, transportation methods, media types and time of day. In accordance with an embodiment, dimensions exist in the logical model and mapping layer 204 and in the presentation layer 202.

In each dimension, attributes can be organized into hierarchical levels. These logical levels represent the organizational rules and reporting needs required by the business of the organization deploying the BI server. They provide the structure (metadata) that the BI server uses to drill into and across dimensions to get more detailed views of data.

Figure 3:
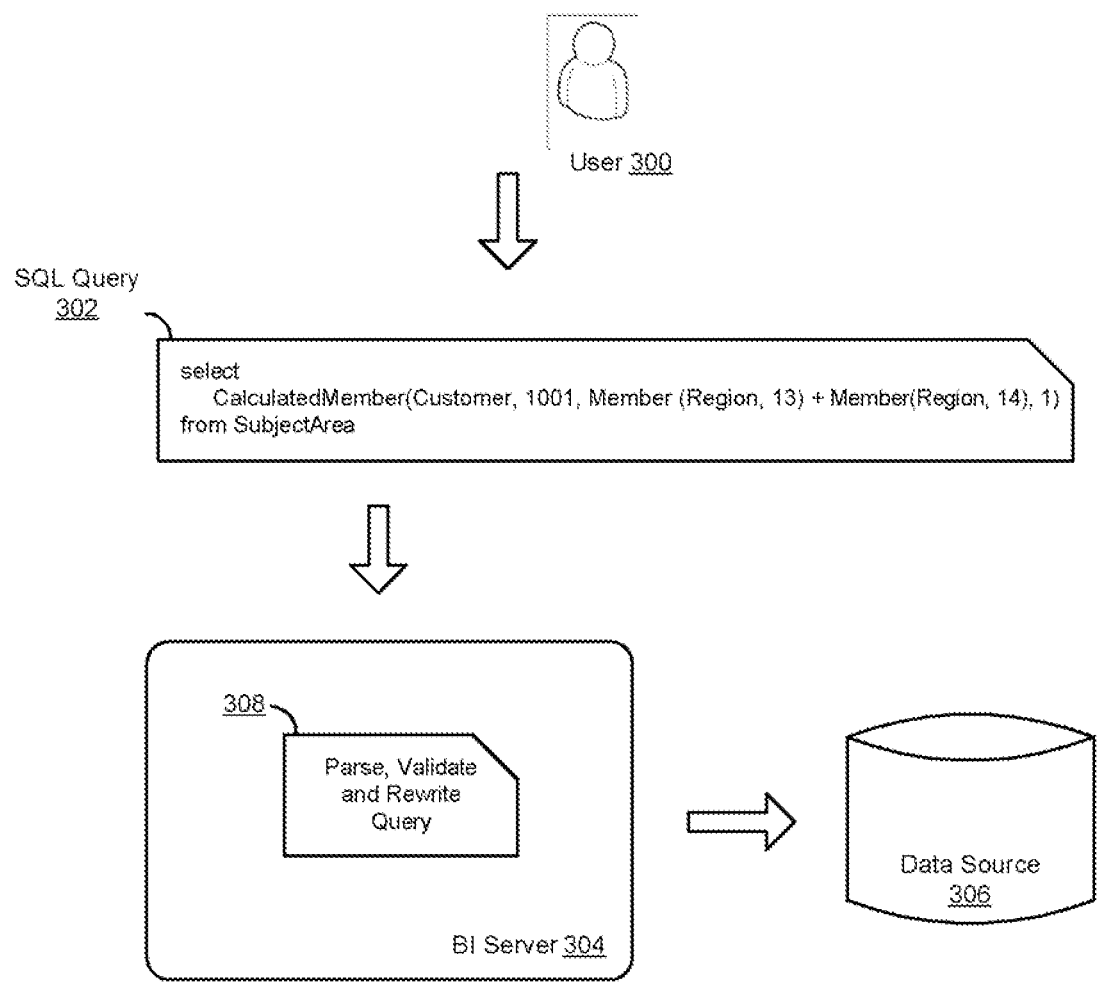
FIG. 3 is an illustration of a query executed against the BI server which includes a calculated member, in accordance with various embodiments of the invention.

FIG. 3 is an illustration of a query executed against the BI server which includes a calculated member, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated herein, a data source 306 can contain a set of data that includes a set of dimension members that can be accessed by the user 300 by way of the BI server 304. The user can submit a query 302, such as a structured query language (SQL) based query to the BI server. In accordance with an embodiment, the query 302 includes a calculated member as a parameter. The calculated member is defined using multiple dimension members and arithmetic operator(s) to come up with an expression that evaluates to a particular value. In accordance with an embodiment, the addition, subtraction, division, multiplication and other arithmetic operators can be used with the calculated member function.

In accordance with an embodiment, once the BI server receives the query, it can parse and validate the query using the set of rules and restrictions that enforce the syntax of the calculated member. Thereafter, the BI server can rewrite and optimize the query for the data source depending on the type of data source that is being accessed. For example, depending on whether the data source is a relational data source or a multidimensional data source, the query is rewritten differently by the BI server. The rewriting and validating of the query by the BI server will be described in further detail below. Once the BI server has rewritten the query, it can be executed against the data source and a set of results received. The result set can be cached for improved performance.

In accordance with an embodiment, the grammar of the calculated member expression in logical SQL can be similar to the syntax illustrated in Table 1 below:

TABLE 1 calculatedMemberExp ::=
    CalculatedMember(<dimensionIdentifier>, <memberValueExp>,
        <calculatedMemberFormula>)
    | CalculatedMember(<dimensionIdentifier>, <memberValueExp>,
        <calculatedMemberFormula>, <solveOrder>)
memberValueExp ::= <literal>
solveOrder ::= <integer>
calculatedMemberFormula ::= <cmfTerm>
    | <calculatedMemberFormula> + <cmfTerm>
    | <calculatedMemberFormula> − <cmfTerm>
cmfTerm ::= <cmfFactor>
    | <cmfTerm> * <cmfFactor>
    | <cmfTerm> / <cmfFactor>
cmfFactor ::= <cmfPrimary>
    | + <cmfPrimary>
    | − <cmfPrimary>
cmfPrimary ::= <numericLiteral>
    | <memberReference>
    | ALL
    | ( <calculatedMemberFormula> )
memberReference ::= Member( <levelIdentifier>, <memberValueExp> )
dimensionIdentifier ::= <identifier>
levelIdentifier ::= <identifier>
literal ::= <numericliteral> | <stringLiteral>
numericLiteral ::= <integer> | <decimal>

In accordance with an embodiment, each calculated member has a label (what the user sees) and a member value that uniquely identifies the member. The unique member value should be passed to the calculated member function as the second argument. When the query is executed, the calculated member function is replaced with the unique member value so that the calculated member rows can be distinguished from other members of the dimension. In accordance with an embodiment, the label of the calculated member not relevant to the calculated member function and should be projected out of the query as a separate expression.

The optional solve order parameter can be used to determine the order of evaluation when there are calculated members from different dimensions in the same query block. In accordance with an embodiment, the calculated member with the lowest solve order is evaluated first and the calculated member with the highest solve order is evaluated last. If the solve order parameter is not supplied, then the calculated member formulas can be evaluated in the order in which they appear in the select list.

By way of example, a CalculatedMember expression is shown below:

---
CalculatedMember(Customer, 10001, Member
(Region, 13) + Member(Region, 14))

---

This expression defines a new calculated member with the value 10001 in the "Customer" dimension. The formula used to calculate the measure values of this calculated member just adds the Region identified as 13 and the Region identified as 14. In accordance with an embodiment, when the calculated member is expressed in a logical SQL query, the dimension identifier is the name of a presentation hierarchy. When the calculated member is defined from the administration tool, on the other hand, dimension identifier is the name of a logical dimension.

In accordance with an embodiment, the BI server can validate the SQL query containing the calculated member by using a set of validation rules. In accordance with one particular embodiment, the set of validation rules can be as follows:

1) Calculated member expressions may only appear in the select list.
2) Only one calculated member is allowed per dimension per query block (one per select list or include clause of selection block.) However, calculated member expressions based on other dimensions may exist in the same query block.
3) No other column from a dimension on which a calculated member is based on may be included anywhere in the same query block. This includes the select list, WHERE clause, HAVING clause, etc. Columns from the calculated member dimension may be referenced within sub-queries however.
4) Columns from other dimensions may be referenced in the same query block provided that there are no calculated member expressions on those dimensions.
5) All level references in a given calculated member expression must belong to the same, specified dimension.

In accordance with an embodiment, after receiving the query, the BI server rewrites and optimizes the query to be executed against the data source. There exists a variety of different techniques for rewriting or optimizing queries and they will vary depending on the implementation of the BI server, the data source and/or other factors. It is noted that the embodiments described herein are not limited to any single methodology for query rewriting. However, by way of example, one such technique for rewriting the query in accordance with an embodiment is described below. This method includes deriving a set of new classes from a base class, such as "RgExpr" in the BI server query optimizer component classes. These derived classes can include the following:

1) Rq ExprCalculatedMember—This expression node contains the definition of a calculated member.
2) RgExprMemberReference—Part of the calculated member formula, this expression node contains an RgExprLevel, RgExprLiteral pair that identifies a particular member of a dimension. Member references that are intended for a specific target will contain an RqTargetColumn instead of an RgExprLevel.
3) Rq ExprQualify—This expression node contains a reference to a particular measure that is qualified by one or more dimension members.

In accordance with an embodiment, the interfaces for the derived classes can be similar to the interfaces illustrated in Table 2 below:

TABLE 2

```
class RqExprCalculatedMember : public RqExpr
{
public:
    RqExprDimension*      GetLogicalDimension( );
    RqExprLiteral*        GetMemberValue( );
    RqExpr*               GetMemberFormula( );
    int32                 GetSolveOrder( );
}
class RqExprMemberReference : public RqExpr
{
public:
    // This method returns a RqExprLevel or a TargetColumn
    RqExpr*               GetLevelExpr( );
    RqExprLiteral*        GetMemberValue( );
}
class RqExprQualify : public RqExpr
{
public:
    RqExpr*                       GetQualifiedExpr( );
    int                           GetNumReferences( ) const;
    void                          SetNumReferences(int nMemberRefs);
    const RqExprMemberReference*  GetIthMemberReference(int i)
    const;
    RqExprMemberReference*        GetIthMemberReference(int i);
    void                          SetIthMemberReference(int i,
                                      RqExprMemberReference*
pNewMemberRef);
}
```

In accordance with an embodiment, when rewriting the request, during logical request generation, the RgExprCalculatedMember expression is replaced with the calculated member value expression. Then all the measures in the query block are replaced with RgExpr nodes composed of arithmetic operators, literals, and RgExprQualify nodes. The replacement expression is derived from the calculated member formula. Arithmetic operators and literals in the calculated member formula are left unchanged. All RgExprMemberRef nodes are converted into RgExprQualify nodes.

In accordance with an embodiment, if there are multiple calculated member expressions in the same query block, then the formulas are applied in the order defined by the solve order parameter. If either calculated member does have an explicit solve order, then the solve order is based on the order in which the calculated member expressions appear in the select list. An example of a logical SQL query is shown below:

---
select
CalculatedMember(Customer, 1001, Member
(Region, 13) + Member(Region, 14), 1),
CalculatedMember(Time, 1234, Member(Month,
65) / Member(Quarter, 3) , 2),
Sales
from SubjectArea

---

In accordance with an embodiment, for the query shown above, the calculated member formula for "Customer" is evaluated before the formula for "Time" because the solve order of the "Customer" calculated member is lower than the solve order of the "Time" calculated member. During logical request generation this query can be rewritten into:

```
select
    1001 as CustomerCalcMember,
    1234 as TimeCalcMember,
    ( Qualify(Sales, Member(RegionID, 13), Member (MonthID, 65)) +
      Qualify(Sales, Member(RegionID, 14), Member (MonthID, 65)) ) /
    ( Qualify(Sales, Member(RegionID, 13), Member (QuarterID, 3)) +
      Qualify(Sales, Member(RegionID, 14), Member (QuarterID, 3)) )
    as Sales
from SubjectArea
```

In accordance with an embodiment, for relational data sources, the target representation of the calculated member is an expression consisting of an arithmetic expression composed of literals and filtered metrics. Internally, within the BI server, the expression above is rewritten as follows:

```
select
    1001 as CustomerCalcMember,
    1234 as TimeCalcMember,
    ( filter(Sales using RegionID = 13 and MonthID = 65) +
      filter(Sales using RegionID = 14 and MonthID = 65) ) /
    ( filter(Sales using RegionID = 13 and QuarterID = 3) +
      filter(Sales using RegionID = 14 and QuarterID = 3) )
    as Sales
from SubjectArea
```

In accordance with an embodiment, after the query is rewritten, it can be optimized by the BI server. In accordance with an embodiment, during query optimization, the RqExprQualify expression nodes undergo some transformations before they can be shipped by the query generators for online analytical processing (OLAP) tools or multidimensional data sources. As one non-limiting example, RqExprAggr nodes can be pulled up (Qualify(Sum(a), b)->Sum(Qualify(a, b)); RqExprQualify nodes can be distributed (e.g. Qualify(a+b, c)->Qualify(a, c)+Qualify(b, c)); and RqExprQualify nodes can be un-nested (e.g. Qualify(Qualify(a, b), c)->Qualify(a, b, c)).

Figure 4:
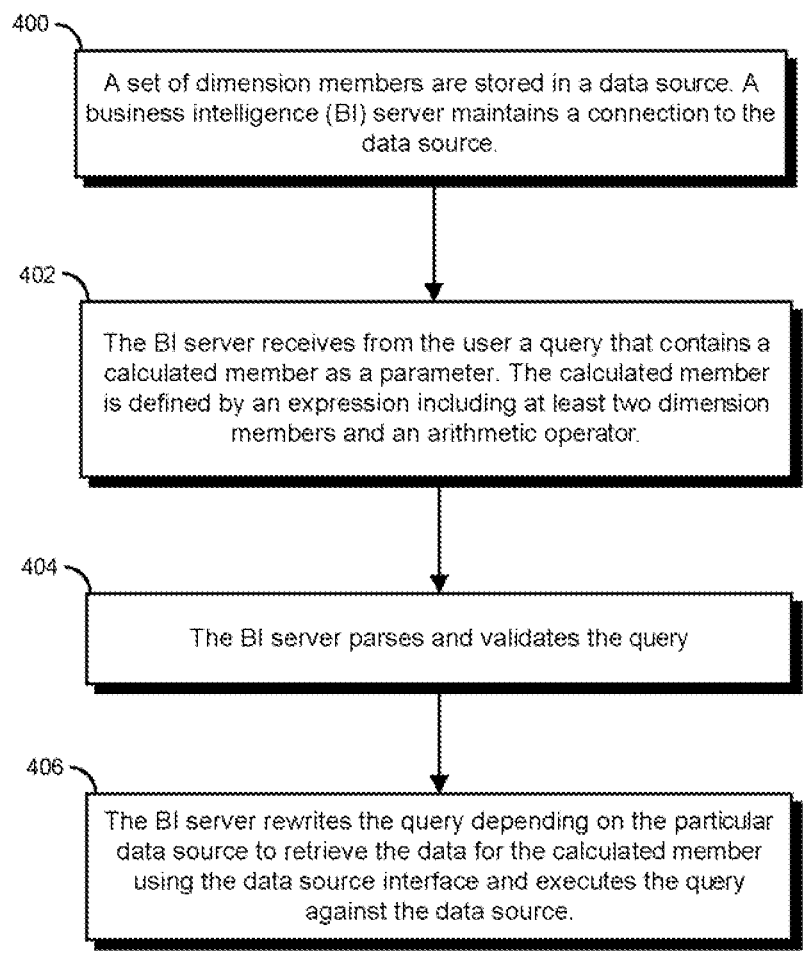
FIG. 4 is a flow chart illustration of providing calculated members for a BI server in accordance with various embodiments of the invention.

FIG. 4 is a flow chart illustration of providing calculated members for a BI server in accordance with various embodiments of the invention. As shown in step 400, a set of dimension members are typically stored in a data source, such as a relational data source or a multidimensional data source. In step 402, the BI server receives a query from the user. The query can include a calculated member as a parameter. The calculated member is specified as an expression using multiple dimension members and arithmetic operations. For example, a calculated member may be the sum or difference between two dimensional members stored in the data source. In step 404, the BI server parses and validates the query. It then rewrites and optimizes the query for the particular data source and then executes the query against the data source (step 406).

As previously mentioned, the ability to specify calculated members reduces the complexity of the queries to retrieve data and allows the user to more freely specify the data members that are used in the context of business intelligence. Users are thus able to: (1) create calculated members involving dimension members from one level (e.g. my_city=('NY'+'Boston'); (2) create calculated members involving dimension members from more than one level (e.g. my_city=('California'—'San Francisco'); (3) create calculated members involving items (that are not in a dimension) and/or attributes; (4) have control over where the calculated member is displayed (e.g. my_city=('California'—'San Francisco') can be displayed either as a state, city or as a top-level node); (5) use a special value called 'ALL' as part of defining their calculated member (e.g. my_other_city=ALL—'NY'—'Boston').

In accordance with various embodiments, custom aggregates are ad-hoc dimension members that are defined as compositions of existing dimension members. For example, a user can define a dimension member "my_geographies" which consists of "New York", "Boston" and "California" by using an expression similar to "my_geographies=('NY', 'Boston', 'California')."

The custom aggregate is created as part of the query and there is no requirement of separately creating the construct beforehand using various administrative tools. In accordance with an embodiment, users of the BI server are able to:

Create custom aggregates involving members from one level. For example, "My_city=('NY', 'Boston')"

Create custom aggregates involving members from more than one level. For example "My_city=('California', 'Seattle')"

Create custom aggregates involving items (that are not in a Dimension) and/or attributes. For example "My_product_color=('Red', 'Green')";

Drill into a custom aggregate node and view the data for the constituent members.

Have control over where the custom aggregate is displayed. For example, a user may wish "My_city=('California', 'Seattle')" to be displayed either as a State, City or as a top-level node (child of the root, sibling of 'All Geographies).

Overlapping members—if a custom member has overlapping members (for example, "My_city=('California', 'San Francisco'), UNION semantics will apply—and hence the overlapping data (in the example, 'San Francisco') will only appear once.

Custom aggregates may be created as a result of a query. For example, the members of a custom aggregate may be the result of "Top 5 Cities based on Sales".

In accordance with various embodiments, a selection clause can be used to define custom aggregates. The selection clause can allow users to simulate UNION ALL semantics. By way of example, the selection clause can be used for post-aggregation selection scenarios, such as: (1) Post-aggregation member selections (2) Drill-insert (3) Union all reports (display a tabular report that has Product Brand, City, Sales UINIONed with Product brand, size, sales). In accordance with an embodiment, the syntax for using the selection clause can be similar to the following:

```
SELECTION <selection_name> (<column A, Column B....>)
(
    INCLUDE (tuple) When (predicate)
)
select selection_name.column A, selection_name.column B...,
non-measure projection list, measure list
from <catalog>
```

In the particular syntax illustrated above, the "selection_name" specifies a name of the selection, which is unique within the query block that it is defined in. The "tuple" is a comma-separated list of elements that may be an item (may or may not be a part of a Dimension), or Custom aggregate/member definition. A tuple should contain as many elements as there are in the column list for the selection (Column A, Column B etc.). If a particular tuple doesn't want any values projected for a column (typically, when the tuple is above the grain of the selection's column list, users could specify 'NULL' for that column). The "predicate" can be a Boolean expression (including sub-queries) that may contain (1) any element in the tuple, (2) ancestor levels of an element (when the element is a Dimension level) and (3) attributes of an element (when the element is a Dimension level). The "when" clause may be used or may be omitted when no selection is required. The "non-measure projection list" is a list that will typically contain all the elements that appear in the tuples of all the selection blocks. This list may also contain items (and Dimension levels, attributes) that are not in any of the tuples.

In accordance with an embodiment, the table below illustrates an example of a selection clause being used to define a custom aggregate. In particular, this selection clause specifies to include years before 1996 and quarters in 1996; and also includes a custom aggregate for years 1995 and 1996.

```
selection TimeSel(CustomAgg, Year, Qtr)
    include (null, Year.Year, null)
        when Year.Year < 1996
    include (null, Year.Year, Qtr.Qtr)
        when Year.Year = 1996
    include ('1995 and 1996', null, null)
        when Year.Year in (1995, 1996)
select TimeSel.CustomAgg as CustomAgg, TimeSel.Year as Year,
    TimeSel.Qtr as Qtr, Sales.Revenue as Revenue
from SnowflakeSales
order by 1, 2
```

Further details regarding calculated members, custom aggregates and the selection clause can be found in U.S. Provisional Application No. 61/349,754, which is incorporated herein in its entirety, including all of the Appendices filed therewith.

Throughout the various contexts described in this disclosure, the embodiments of the invention further encompass computer apparatus, computing systems and machine-readable media configured to carry out the foregoing systems and methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); and any type of media or device suitable for storing instructions and/or information. The computer program product can be transmitted in whole or in parts and over one or more public and/or private networks wherein the transmission includes instructions which can be used by one or more processors to perform any of the features presented herein. In various embodiments, the transmission may include a plurality of separate transmissions. In one embodiment, the computer readable storage medium is non-transitory.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention.

What is claimed is:

1. A method for enabling calculated members within a query, said method comprising:
    storing a set of dimension members in a data source, said data source having a connection to a business intelligence (BI) server;
    receiving, by said BI server, a query that contains a calculated member as a parameter, said calculated member being defined by a calculated member expression including at least two of said dimension members and an arithmetic operator;
    parsing and validating said query by the BI server;
    rewriting the query by the BI server to retrieve the data for the calculated member using an interface of said data source, wherein the rewritten query uses a replacement expression derived from the calculated member expression; and
    executing the query against the data source.

2. The method of claim 1, wherein the calculated member further includes a label and a member value that uniquely identifies the member.

3. The method of claim 1, wherein syntax for the calculated member comprises a dimension identifier, a member value expression, a formula and a solving order.

4. The method of claim 3, wherein if there are multiple calculated member expressions in a same query block, then the formula of said multiple calculated member expressions are applied in the order defined by the solving order parameter.

5. The method of claim 3, wherein upon executing the query, the BI server replaces the calculated member with the unique member value to distinguish the calculated member from other members of the dimension.

6. The method of claim 1, wherein the calculated member is created ad-hoc and includes dimension members from a plurality of levels, items and/or attributes.

7. The method of claim 1, wherein the query further includes a custom aggregate member defined ad-hoc as a composition of a plurality of existing dimension members in the data source.

8. The method of claim 1, wherein the calculated member is specified using a selection clause.

9. The method of claim 1, wherein the data source includes one or more of the following: a relational database and a multidimensional database.

10. The method of claim 1, wherein the calculated member is associated with a solve order parameter used to determine an order of evaluation when there are multiple calculated members from different dimensions in the query.

11. A system for enabling calculated members within a query, said system comprising:
- a data source storing a set of dimension members; and
- a business intelligence (BI) server that receives a query containing a calculated member as a parameter, said calculated member being defined by a calculated member expression including at least two of said dimension members and an arithmetic operator;
- wherein the BI server
  - parses and validates the query;
  - rewrites the query to retrieve the data for the calculated member from said data source, wherein the rewritten query uses a replacement expression derived from the calculated member expression; and
  - executes the query against the data source.

12. The system of claim 11, wherein the calculated member further includes a label and a member value that uniquely identifies the member.

13. The system of claim 11, wherein syntax for the calculated member comprises a dimension identifier, a member value expression, a formula and a solving order.

14. The system of claim 13, wherein if there are multiple calculated member expressions in a same query block, then the formula of said multiple calculated member expressions are applied in the order defined by the solving order parameter.

15. The system of claim 13, wherein upon executing the query, the BI server replaces the calculated member with the unique member value to distinguish the calculated member from other members of the dimension.

16. The system of claim 13, wherein the calculated member is created ad-hoc and includes dimension members from a plurality of levels, items and/or attributes.

17. The system of claim 11, wherein the query further includes a custom aggregate member defined ad-hoc as a composition of a plurality of existing dimension members in the data source.

18. The system of claim 11, wherein the calculated member is specified using a selection clause.

19. The system of claim 11, wherein the data source includes one or more of the following: a relational database and a multidimensional database.

20. A computer-readable storage medium storing a set of instructions, said instructions, when executed by one or more processors, causing the one or more processors to perform the steps comprising:
- storing a set of dimension members in a data source, said data source having a connection to a business intelligence (BI) server;
- receiving, by said BI server, a query that contains a calculated member as a parameter, said calculated member being defined by a calculated member expression including at least two of said dimension members and an arithmetic operator;
- parsing and validating said query by the BI server;
- rewriting the query by the BI server to retrieve the data for the calculated member using an interface of said data source, wherein the rewritten query uses a replacement expression derived from the calculated member expression; and
- executing the query against the data source.

* * * * *

UNITED STATES PATENT AND TRADEMARK OFFICE
CERTIFICATE OF CORRECTION

| | | |
|---|---|---|
| PATENT NO. | : 8,458,206 B2 | Page 1 of 1 |
| APPLICATION NO. | : 13/038243 | |
| DATED | : June 4, 2013 | |
| INVENTOR(S) | : Bolsius et al. | |

It is certified that error appears in the above-identified patent and that said Letters Patent is hereby corrected as shown below:

In the Specification

In column 7, line 55, delete ""RgExpr"" and insert -- "RqExpr" --, therefor.

In column 7, line 57, delete "Rq ExprCalculatedMember" and insert -- RqExprCalculatedMember --, therefor.

In column 7, line 59, delete "RgExprMemberReference" and insert -- RqExprMemberReference --, therefor.

In column 7, line 61, delete "RgExprLevel, RgExprLiteral" and insert -- RqExprLevel, RqExprLiteral --, therefor.

In column 7, line 64, delete "RgExprLevel." and insert -- RqExprLevel. --, therefor.

In column 7, line 65, delete "Rq ExprQualify" and insert -- RqExprQualify --, therefor.

In column 8, line 34-35, delete "RgExprCalculatedMember" and insert -- RqExprCalculatedMember --, therefor.

In column 8, line 37, delete "RgExpr" and insert -- RqExpr --, therefor.

In column 8, line 38, delete "RgExprQualify" and insert -- RqExprQualify --, therefor.

In column 8, line 41-42, delete "RgExprMemberRef" and insert -- RqExprMemberRef --, therefor.

In column 8, line 42, delete "RgExprQualify" and insert -- RqExprQualify --, therefor.

Signed and Sealed this
Eighth Day of October, 2013

Teresa Stanek Rea
*Deputy Director of the United States Patent and Trademark Office*